(12) United States Patent
Raisch et al.

(10) Patent No.: US 9,069,592 B2
(45) Date of Patent: Jun. 30, 2015

(54) GENERIC TRANSPORT LAYER MECHANISM FOR FIRMWARE COMMUNICATION

(75) Inventors: Christoph Raisch, Boeblingen (DE); Marco Kraemer, Boeblingen (DE); Jan-Bernd Themann, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 12/915,175

(22) Filed: Oct. 29, 2010

(65) Prior Publication Data

US 2011/0107347 A1 May 5, 2011

(30) Foreign Application Priority Data

Nov. 2, 2009 (EP) .................................... 09174754

(51) Int. Cl.
| | |
|---|---|
| *G06F 9/455* | (2006.01) |
| *G06F 9/54* | (2006.01) |
| *G06F 9/44* | (2006.01) |
| *H04L 12/861* | (2013.01) |
| *H04L 29/08* | (2006.01) |

(52) U.S. Cl.
CPC ............ *G06F 9/45533* (2013.01); *G06F 9/541* (2013.01); *G06F 9/441* (2013.01); *G06F 9/546* (2013.01); *H04L 49/90* (2013.01); *H04L 69/326* (2013.01); *H04L 69/329* (2013.01)

(58) Field of Classification Search
CPC ...... G06F 9/541; G06F 9/45533; G06F 9/546; G06F 9/4411
See application file for complete search history.

(56) References Cited

U.S. PATENT DOCUMENTS

| | | | |
|---|---|---|---|
| 6,757,756 B1* | 6/2004 | Lanteigne et al. | 710/52 |
| 2002/0184352 A1* | 12/2002 | Jain et al. | 709/223 |
| 2005/0027807 A1* | 2/2005 | Fengler et al. | 709/206 |
| 2005/0235123 A1* | 10/2005 | Zimmer et al. | 711/170 |
| 2007/0011486 A1* | 1/2007 | Li et al. | 714/5 |
| 2007/0079295 A1* | 4/2007 | Zimmer et al. | 717/136 |
| 2009/0006805 A1* | 1/2009 | Anderson et al. | 711/207 |
| 2009/0055641 A1* | 2/2009 | Smith | 713/100 |
| 2010/0131734 A1* | 5/2010 | Clegg et al. | 711/170 |

\* cited by examiner

*Primary Examiner* — Charles E Anya
(74) *Attorney, Agent, or Firm* — Cantor Colburn LLP; William A. Kinnaman, Jr.

(57) ABSTRACT

A computing system including a communication network architecture with a transport layer mechanism. The computing system is capable of supporting a multitude of different application protocols involving information and/or data exchange between an operating system instance and various firmware services. The computing system may include an operating system instance with a Generic Transport Driver supporting the application protocols in the operating system instance, a firmware service connected to a Generic Transport Facility via a Generic Firmware Service Interface and a virtual machine with a Generic Transport Passthrough. The Generic Transport Driver of the operating system instance exchanges communication protocol data with the Generic Transport Facility of the firmware component via the generic Transport Passthrough.

8 Claims, 5 Drawing Sheets

GENERIC TRANSPORT LAYER MECHANISM FOR FIRMWARE COMMUNICATION

CROSS REFERENCE TO RELATED APPLICATION

This application claims priority under 35 U.S.C. §119 from European Patent Application No. 09174754.3 filed Nov. 2, 2009, the entire contents of which are incorporated herein by reference.

BACKGROUND OF THE INVENTION

1. Field of the Invention

The invention relates generally to the field of communication network architectures for computing systems. More specifically, the invention relates to a transport layer architecture for network communication between an operating system instance supporting multiple application protocols and firmware services.

2. Description of the Related Art

Computing systems generally include communication mechanisms such as channel architectures for exchanging information with a variety of firmware/hardware services accessible to the system. Often, however, these channel architectures are geared at transmitting large amounts of data and programs between the operating system and the firmware/hardware services. Thus, the channel architecture is generally laid out for mass, not for speed.

Recently, however, some transmission protocols have emerged, the specific requirements of which cannot be fulfilled by the existing channel architectures. These protocol applications for coupling two machines require a mechanism for very fast transmission of small messages in order to lock or to open memory regions. State-of-the-art channel architectures are unable to satisfy these speed requirements, which is why these applications are generally implemented by a dedicated coupling transport driver (parallel sysplex). For example, the QDIO protocol application employed for addressing network/ethernet interface hardware makes use of a dedicated transport mechanism which involves a dedicated QDIO transport driver on the hardware end. Similarly, console application SCLP (System Call Logical Processor) used for addressing and communicating with service elements connected to the system requires a dedicated transport mechanism in order to address service elements located outside of the machine properly. Thus, in order to satisfy the requirements of these applications, each application has developed its own individual application protocol with an individual transport layer as well as an individual service transport engine. A computing system running a variety of these applications thus has to provide a multitude of dedicated transport layer mechanisms.

Corresponding to each of these individual application protocols and transport layer mechanisms, a translation layer has to be provided in the system's virtual machine. In order to guarantee data integrity of all communication processes related to the various applications, the virtual machine has to keep track of all storage areas which need to be accessed during the applications' execution and ensure that they are indeed available. This requires that a dedicated storage control mechanism be implemented within the virtual machine for each application.

Consequently, each additional application to be installed in the computing system requires additional efforts in the operating system layer, the firmware layer and the virtual machine layer. All three layers have to enable dedicated individual protocols of each application. Since existing protocols are not generic enough to map all transport layers, this requires a lot of programming and implementation efforts.

As far as queuing structures are concerned, related art firmware queue interfaces define a fixed queue structure which is implicit and proprietary to the protocol and invisible to the transport service. As a consequence, in related art communication mechanisms, the virtual machine needs to obtain information on the queue structure of each specific protocol. This requires providing appropriate patches of code for the various protocols and delivering them to the virtual machine.

Thus, there is a need for a modified communication architecture which reduces the complexity, cost and effort which is customarily related to implementing a multitude of dedicated transport layer mechanisms corresponding to multiple dedicated applications. Specifically, there is a need for communication architecture which is capable of handling a multitude of different application protocols requiring information and/or data exchange between an operating system instance and various firmware services.

SUMMARY OF THE INVENTION

According to an aspect of the present invention, a computer system is presented which includes an operating system instance with a Generic Transport Driver supporting at least two communication protocols for applications in the operating system instance and a firmware service connected to a Generic Transport Facility via a Generic Firmware Service Interface, wherein the Generic Transport Driver exchanges communication protocol data with the Generic Transport Facility.

According to another aspect of the present invention, a method for queue creation in a communication network architecture of a computing system is provided. The method includes issuing a queue request for a communication application protocol, communicating said queue request from a Generic Transport Driver to a Generic Transport Facility via a Generic Transport Passthrough, identifying and instantiating a matching firmware service, and communicating completion of said queue request to the communication application protocol.

The computer system may include an operating system instance with a Generic Transport Driver supporting at least two communication application protocols, a firmware service connected to a Generic Transport Facility via a Generic Firmware Service Interface, and a virtual machine with a Generic Transport Passthrough wherein the Generic Transport Driver of operating system instance exchanges communication protocol data with the Generic Transport Facility of firmware component via the generic Transport Passthrough Facility.

According to yet another aspect of the present invention, a method for queue placement and execution in a communication network architecture of a computing system is presented. The method includes placing a command request from a communication application protocol, communicating the command request from a Generic Transport Driver to a Generic Transport Facility via Generic Transport Passthrough, identifying and instantiating a matching firmware service, processing the command, and communicating completion of the command to a communication application protocol.

The computer system may further include: an operating system instance with a Generic Transport Driver supporting at least two communication application protocols; a firmware service connected to a Generic Transport Facility via a Generic Firmware Service Interface; and a virtual machine with a Generic Transport Passthrough wherein the Generic Transport Driver of operating system instance exchanges communication protocol data with the Generic Transport Facility of the firmware component via the generic Transport Passthrough Facility.

According to still yet another aspect of the invention, a data processing program for execution in a data processing system is provided. The data processing program includes software code portions for implementing a transport layer between an operating system instance and a firmware service. The software code portions may include a Generic Transport Driver supporting at least two communication protocols for applications in the operating system instance, and a Generic Transport Facility connecting to the firmware service; wherein the Generic Transport Driver exchanges communication protocol data with the Generic Transport Facility.

According to another aspect of the present invention, a data processing program for execution in a data processing system including software code portions for performing a method when the program is run on a computer is provided. The method includes placing a command request from a communication application protocol, communicating the command request from a Generic Transport Driver to a Generic Transport Facility via a Generic Transport Passthrough, identifying and instantiating a matching firmware service, processing the command, and communicating completion of the command to communication application protocol.

The computer may include: an operating system instance with a Generic Transport Driver supporting at least two communication application protocols; a firmware service connected to a Generic Transport Facility via a Generic Firmware Service Interface; and a virtual machine with a Generic Transport Passthrough such that the Generic Transport Driver of operating system instance exchanges communication protocol data with the Generic Transport Facility of firmware component via the generic Transport Passthrough Facility.

According to another aspect of the present invention a program product including a computer useable medium including a computer readable program, wherein the computer readable program when executed on a computer causes the computer to execute a method is provided. The method includes: placing a command request from a communication application protocol within an operating system instance with a Generic Transport Driver supporting multiple communication application protocols; communicating said command request from the Generic Transport Driver to a Generic Transport Facility connected to multiple firmware services; identifying and instantiating a matching firmware service; processing the command; and communicating completion of said command to communication application protocol.

BRIEF DESCRIPTION OF THE DRAWINGS

The present invention together with the above-mentioned and other objects and advantages may best be understood from the following detailed description of the embodiments, but not restricted to the embodiments, wherein is shown.

Figure 1:
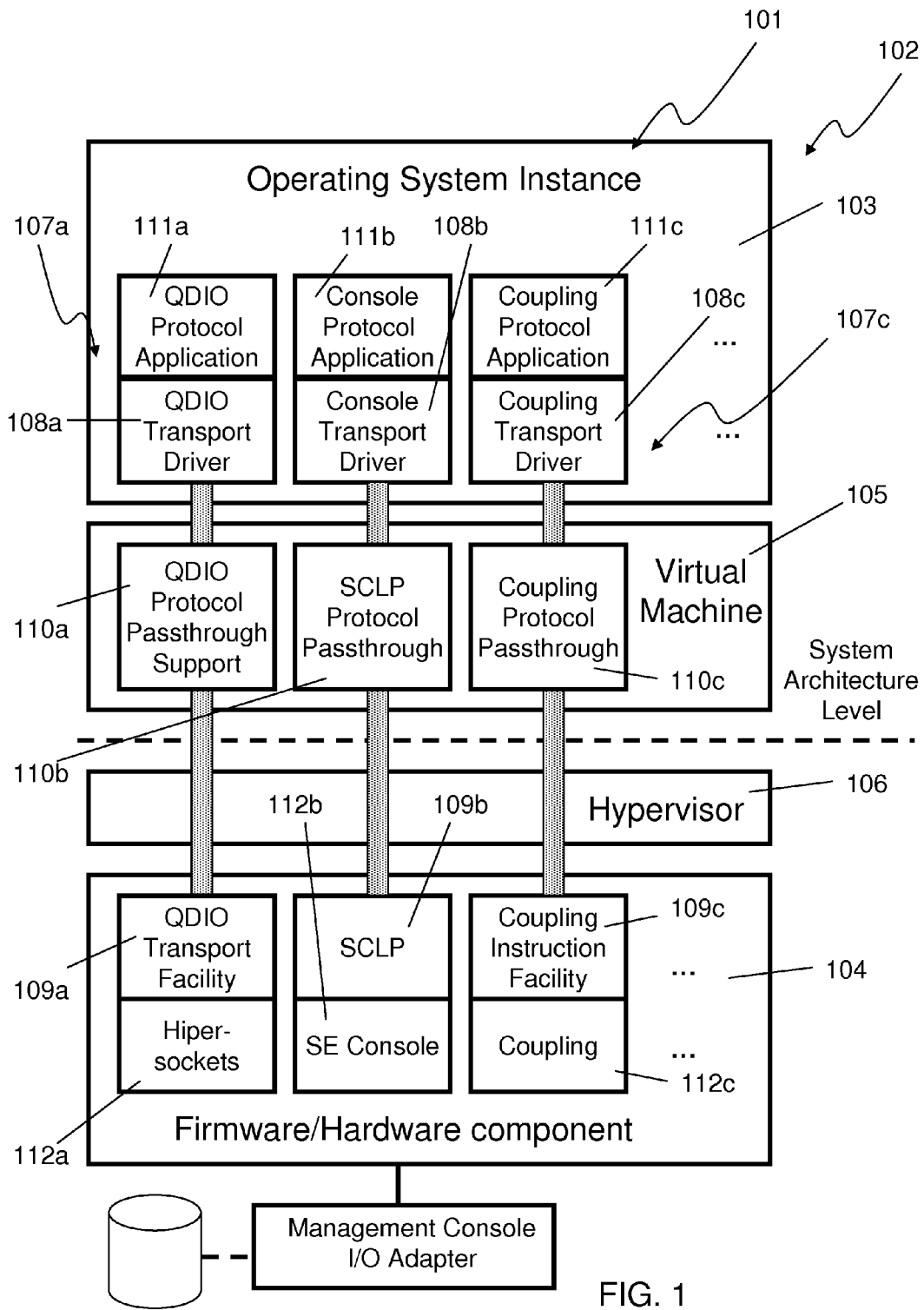
FIG. 1 a computing system with a communication network architecture including multiple dedicated transport engines.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF THE PREFERRED EMBODIMENTS

It is an object of the invention to provide a computing system with a communication mechanism including a transport layer architecture which is capable of supporting a multitude of different application protocols involving information and/or data exchange between an operating system instance and various firmware services. It is a further object of the invention to provide methods for queue creation and for queue processing in a such a computing system.

These objects are achieved by the features of the independent claims. The other claims and the specification disclose advantageous embodiments of the invention.

According to a first aspect of the invention, a computer system is provided which includes an operating system instance with a Generic Transport Driver supporting at least two communication protocols for applications in the operating system instance and a firmware service connected to a Generic Transport Facility via a Generic Firmware Service Interface, wherein the Generic Transport Driver exchanges communication protocol data with the Generic Transport Facility.

In a preferred embodiment, the computer system also includes a virtual machine with a Generic Transport Passthrough, so that the Generic Transport Driver of operating system instance exchanges communication protocol data with the Generic Transport Facility of firmware component via the generic Transport Passthrough.

According to a second aspect of the invention, a method for queue creation in a communication network architecture of a computing system is provided. The computer system includes an operating system instance with a Generic Transport Driver supporting at least two communication application protocols, a firmware service connected to a Generic Transport Facility via a Generic Firmware Service Interface, and a virtual machine with a Generic Transport Passthrough such that the Generic Transport Driver of operating system instance exchanges communication protocol data with the Generic Transport Facility of firmware component via the generic Transport Passthrough Facility. The method includes the steps of (1) issuing a queue request for a communication application protocol, (2) communicating this queue request from Generic Transport Driver to Generic Transport Facility via Generic Transport Passthrough, (3) allocating memory resources for queue processing, (4) identifying and instantiating a matching firmware service and (5) communicating completion of said queue request to communication application protocol.

According to a third aspect of the invention, a method for queue placement and execution in a communication network architecture of a computing system is provided. The computer system includes an operating system instance with a Generic Transport Driver supporting at least two communication application protocols, a firmware service connected to a Generic Transport Facility via a Generic Firmware Service Interface, and a virtual machine with a Generic Transport Passthrough such that the Generic Transport Driver of the operating system instance exchanges communication protocol data with the Generic Transport Facility of firmware component via the generic Transport Passthrough Facility. The method includes the steps of (1) placing a command request from a communication application protocol, (2) communicating this command request from Generic Transport Driver to Generic Transport Facility via Generic Transport Passthrough, (3) allocating memory resources for command processing, (4) identifying and instantiating a matching firmware service, (5) processing the command and (6) communicating completion of the command to the communication application protocol.

Within a layered architecture of a computer communication network, each layer consists of a collection of functions which provide services to the layer above and receive services from the layer below. Specifically, the transport layer consists of methods and protocols for communicating structured information with the computer communication network.

Application information is encapsulated into data units in such a way that it can be transferred to the network infrastructure for transmission to the destination host.

Each data unit includes control information as well as user data (payload). The control information contains source and destination addresses. The data units may be delivered asynchronously in a first-come-first-serve fashion or according to a scheduling scheme. Moreover, the reverse transaction is enabled by abstracting data units transmitted by the network and delivering their payload to the respective application. Note that the transport layer does not possess any resources of its own: all activities are supplied by the application layer located above the transport layer. The transport layer protocols establish a direct virtual host-to-host communications transport medium for applications. The transport layer is thus responsible for the exchange and delivery of structured information between a Transport Driver on the operating system side of a computing system and a Transport Facility on the hardware/firmware side.

FIG. 1 shows a schematic representation of a related art computing system 101 with a communication network architecture 102 connecting an operating system instance 103 (such as Linux) to a firmware/hardware instance 104 (such as a supplier's internal firmware). Operating system instance 103 and firmware/hardware 104 are each equipped with corresponding protocols for various applications; every one of these protocols contains a set of instructions pertaining to the contents of the data transfer specific to this application. A virtual machine 105 and a corresponding software layer (hypervisor 106) provide a mechanism for enabling different operating system environments to share the same underlying physical machine.

The computing system 101 enables numerous applications, such as file exchange services, I/O processes etc. While some applications (not shown in FIG. 1) may use a generic channel hardware for data transport, a number of these applications 111a-111c require a dedicated service transport engine 107a-107c for connecting to a specific firmware service 112a-112c. Each one of these dedicated transport engines 107a, 107b, 107c includes a dedicated transport driver 108a, 108b, 108c on the operating system 103 side and a dedicated transport facility 109a, 109b, 109c connecting to the corresponding firmware service 112a, 112b, 112c on the firmware/hardware side 104; moreover, for each of these applications, a dedicated transport passthrough 110a, 110b, 110c is provided as a translation layer within the virtual machine 105.

In the example of FIG. 1, a specific I/O protocol application QDIO 111a employed for addressing network/ethernet hardware, storage etc. requires a dedicated QDIO Transport Driver 108a as part the operating system instance 103, a dedicated QDIO transport facility 109a on the hardware side 104 and a specific QDIO passthrough support 110a in virtual machine 105. The passthrough support 110a within the virtual machine 105 is required so that all memory areas which need to be accessed during the I/O operation are indeed available.

Similarly, computing system 101 contains a console application SCLP (System Call Logical Processor) 111b used for addressing and communicating with service elements 112b connected to the system 101; on the transport layer, this console application 111b requires a dedicated SCLP transport driver 108b as part of the operating system instance 103, a dedicated SCLP transport facility 109b connected to the service element 112b on the hardware side 104 and a specific SCLP passthrough 110b in virtual machine 105.

Moreover, a specific coupling protocol application 111c may be required for coupling computing system 101 to other (mainframe) computing systems, i.e. for synchronizing clocks, transmitting messages related to opening/closing storage regions between the systems etc. In particular, coupling protocol application 111c may be used for connecting mainframes in a parallel sysplex. On the transport layer, this coupling application requires a dedicated Coupling Transport Driver 108c as part of the operating system instance 103, a dedicated coupling instruction facility 109c on the firmware side 104 as well as a specific coupling protocol passthrough 110c in virtual machine 105.

Thus, each of the applications 111a-111c requires a separate transport layer including a dedicated transport driver 108a-108c on the operating system instance 103, a dedicated transport facility 109a-109c and a dedicated protocol passthrough 110a-110c in the virtual machine.

Figure 2:
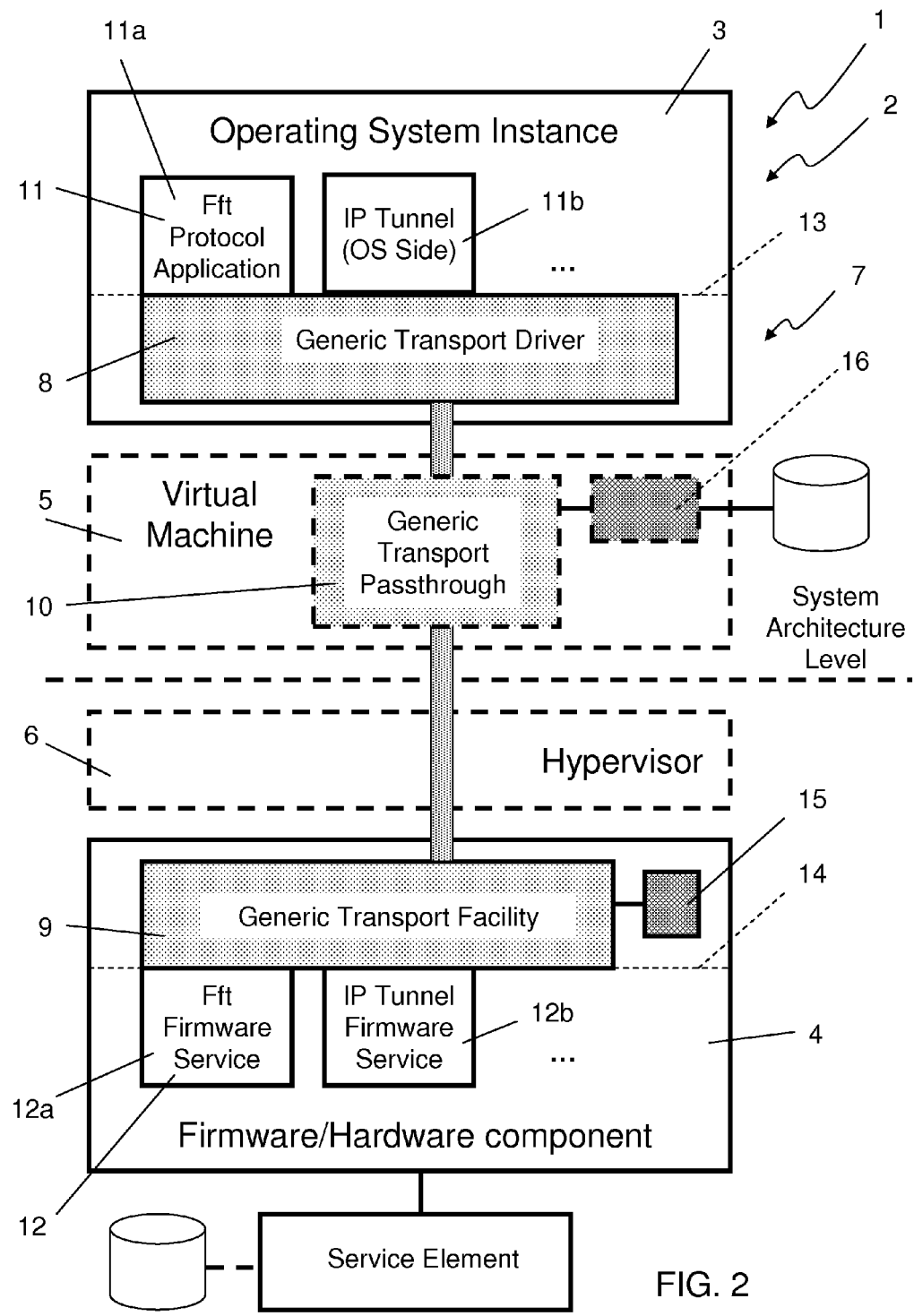
FIG. 2 a computing system with a communication network architecture including a Generic Transport Layer Mechanism.

In contrast, FIG. 2 shows a schematic representation of a preferred embodiment of a computer communication network architecture 2 for a computing system 1, with generic transport layer mechanisms both on the operating system side 3 and on the firmware/hardware side 4 replacing the numerous dedicated transport layer mechanisms of FIG. 1. Thus, each of the various protocol applications 11a, 11b of FIG. 2 uses one and the same transport layer mechanism for communicating data and instructions back and forth from the operating system 3 side to the firmware/hardware 4 side.

Generic transport layer mechanism 7 includes a Generic Transport Driver 8 in the operating system instance 3, to be used by various dedicated protocol applications 11a, 11b; a Generic Transport Facility 9 to be used by various firmware modules 12a, 12b (both hardware and software implementation) on the firmware/hardware side 4; and in case the computing system 1 includes a virtual machine 5, a Generic Transport Passthrough 10 as part of the virtual machine 5.

Generic transport driver 8 and Generic Transport Facility 9 cooperate to ensure that information originating from any of the application protocols 11a, 11b located in the operating system instance 3 will be communicated to/from the corresponding firmware services 12a, 12b. In contrast to the computing network system architecture 102 shown in FIG. 1, only one Generic Transport Driver 8 and one Generic Transport Facility 9 are provided on the system's transport layer. The various applications 11a, 11b shown in FIG. 2 are thus constructed on top of the Generic Transport Driver 8 via an architectural generic Transport Layer Interface 13, and data packets pertaining to all these applications 11a, 11b are passed through this interface 13 to the Generic Transport Driver 8. By the same token, all firmware services 12a, 12b are hooked up to the Generic Transport Facility 9 via a generic Firmware Service Interface 14.

For any of the applications shown in FIG. 2, the specific application protocol 11a, 11b is kept separate from the associated transport layer mechanism 7, the separation line being formed by the Transport Layer Interface 13: While the application protocols 11a, 11b contain dedicated logic pertaining to the respective application, the Generic Transport Driver 8 is generic, i.e. capable of communicating information pertaining to any of the applications. By the same token, the Generic Transport Facility 9 represents a generic transport layer end point for all firmware/hardware services 12a, 12b.

For implementing the communication processes between protocol applications 11a, 11b and firmware services 12a, 12b, the generic transport layer mechanism 7 makes use of protocol independent queue management primitives such as queue creation, queue destruction and queue update. The queuing system provides a downward communication queue which communicates commands from the operating system instance 3 to the firmware 4 as well as an upward communication queue for communicating responses from the firmware 4 to the operating system instance 3. The generic transport layer mechanism 7 thus furnishes a generic transport solution for all message based protocols between operating system instance 3 and firmware 4 in which application protocols are supplied from the operating system instance 3, whereas instructions as well as interrupts are supplied by firmware/hardware 4.

As part of this generic transport layer mechanism, the Generic Transport Facility 9 accesses and administers a firmware services directory 15 which contains information on all firmware services 12a, 12b available for each operating system 3 within the computing system 1. The firmware service directory 15 is generated as part of the system start-up procedure and is used for detection and identification of firmware services and for communication of potential transport failures. As a new application is implemented, an entry in the firmware services directory 15 is generated. The firmware services directory 15 thus serves as a kind of "phone book" of the applications available in the respective operating system instance.

Whenever a new firmware service 12 is registered, the Generic Transport Facility 9 stores the corresponding service parameters and attributes in the firmware services directory 15 and reports them to the Operating System instance 3. In order to accomplish this, the Generic Transport Facility 9 contains an interface to firmware 4 for registration of firmware services 12 into the firmware services directory 15 as well as means for withdrawing information stored in the firmware services directory 15. On request, the Generic Transport Facility 9 accesses the firmware services directory 15 and reports selected contents (i.e. available services and service parameters) to the Operating System instance 3.

The Generic Transport Facility 9 is capable of handling generic queue and service management commands: A "create queue" command triggers an instantiation of a firmware service 12 instance; the corresponding queue creation method 200 will be described further on in conjunction with FIG. 3a. A "destroy queue" command triggers the destruction of a firmware service 12 instance. A "query service directory" command returns available firmware services 12 as stored in the firmware services directory 15, and a "query firmware service parameter" command returns parameters of a specific firmware service 12a, 12b as stored in the firmware services directory 15.

Moreover, the Generic Transport Facility 9 includes means for handling queue signaling commands; these trigger a specific firmware service 12a, 12b to process a command queue. Also, means for encapsulating access to queue elements are provided: these are used by firmware services 12a, 12b to work on command and response queues. In addition, the Generic Transport Facility 9 includes means for handling triggers from firmware services 12a, 12b to the Operating System 3.

In the preferred embodiment shown in FIG. 2, computer system 1 includes virtual machine 5 as well as a hypervisor 6 which enable different operating system to be run on the same underlying physical machine. The virtual machine 5 forms part of the system architecture level while the hypervisor 6 is located outside the system. The virtual machine 5 includes a Generic Transport Passthrough 10 which forms part of the generic transport mechanism 7 and which is used as a translation layer for all application protocols 11—in contrast to the related art transport layer mechanism 107 of FIG. 1 in which the virtual machine 105 contains a dedicated transport passthrough 110a-110c for each application protocol 111a-111c.

The Generic Transport Passthrough 10 of the virtual machine 5 includes a generic shadow queue service which performs address translations from the operating system instance 3 address space to a virtual machine 5 address space. For successfully implementing a generic queueing system for processing communication requests pertaining to different application protocols 11a, 11b, the virtual machine 5 parser has to ensure that all data areas which the a queue points to are available in storage within computing system 1. In order to implement this, Moreover, Generic Transport Passthrough 10 includes means for accessing a Paging Facility 16 within virtual machine 5 which enables in-flight page pinning of pages: Since queues pertaining to various applications of computing system 1 are processed by Generic Transport Layer Mechanism 7, it is necessary to keep track of all data used by the downward communication processes and to ensure that all data which may be required in an upward communication process are readily available.

Therefore, the memory regions holding this kind of data have to be "pinned" by the downward communication process in order to avoid that these data may be flushed out of the memory regions. As a consequence of this page pinning, random access from firmware 12a, 12b to the operating system 3 memory (i.e. along the upward direction) is only allowed to memory locations which have been pinned through the downward communication queue and have not been released (i.e. marked as terminated by the upward communication queue). Translated page descriptors are stored in a dedicated memory area 17 which is inaccessible to the operating system instance 3.

In addition to providing a page pinning mechanism, virtual machine parser has to ensure that all addresses within the command queue have been translated; this is implemented by providing an operating system addressing scheme with a well-defined relation to a firmware addressing scheme.

Note that the Generic Transport Passthrough 10 is transparent in the sense that it passes communication between the Generic Transport Driver 8 and the Generic Transport Facility 9 unobstructed; however, as described above, it may modify some queue related information, e.g. perform address reallocations as part of a page pinning process. Since only one Generic Transport Passthrough 10 is required for different protocol applications 12a, 12b, simple virtualization of computing system 1 is ensured.

As an example of a protocol application using the Generic Transport Layer Mechanism 7 of FIG. 2, consider a file transfer application. Conventional SCLP protocol applications exhibit major problems whenever large amounts of data have to be transported, since the latency of the connection is quite large, and the bandwidth is limited to transfer rates of a few kBytes/sec. In contrast, by using the fft (fast file transfer) protocol, data transfer rates of MBytes/sec can be achieved. The fft application protocol 12b contains the logic of this application (i.e. the information content which is to be sent back and forth between the communication end points), whereas the Generic Transport Driver 8 ensures that the associated information will be communicated correctly. Whenever fft application protocol 12b is instantiated, Generic Transport Driver 8 calls on Generic Transport Facility 9 to access firmware service directory 15, locate appropriate firmware service 12a and report this to operating instance 3.

As a further example, consider the usage of an IP Tunnel, i.e. an IP network communications channel 11b, 12b for transmitting IP data packages back and forth using TCP/IP communication. In this communication mode every IP packet, including addressing information of the source and destination, is encapsulated within another packet format native to the transit network. This can be used for connecting two disconnected IP networks that do not have a native routing path to each other.

Figure 3A:
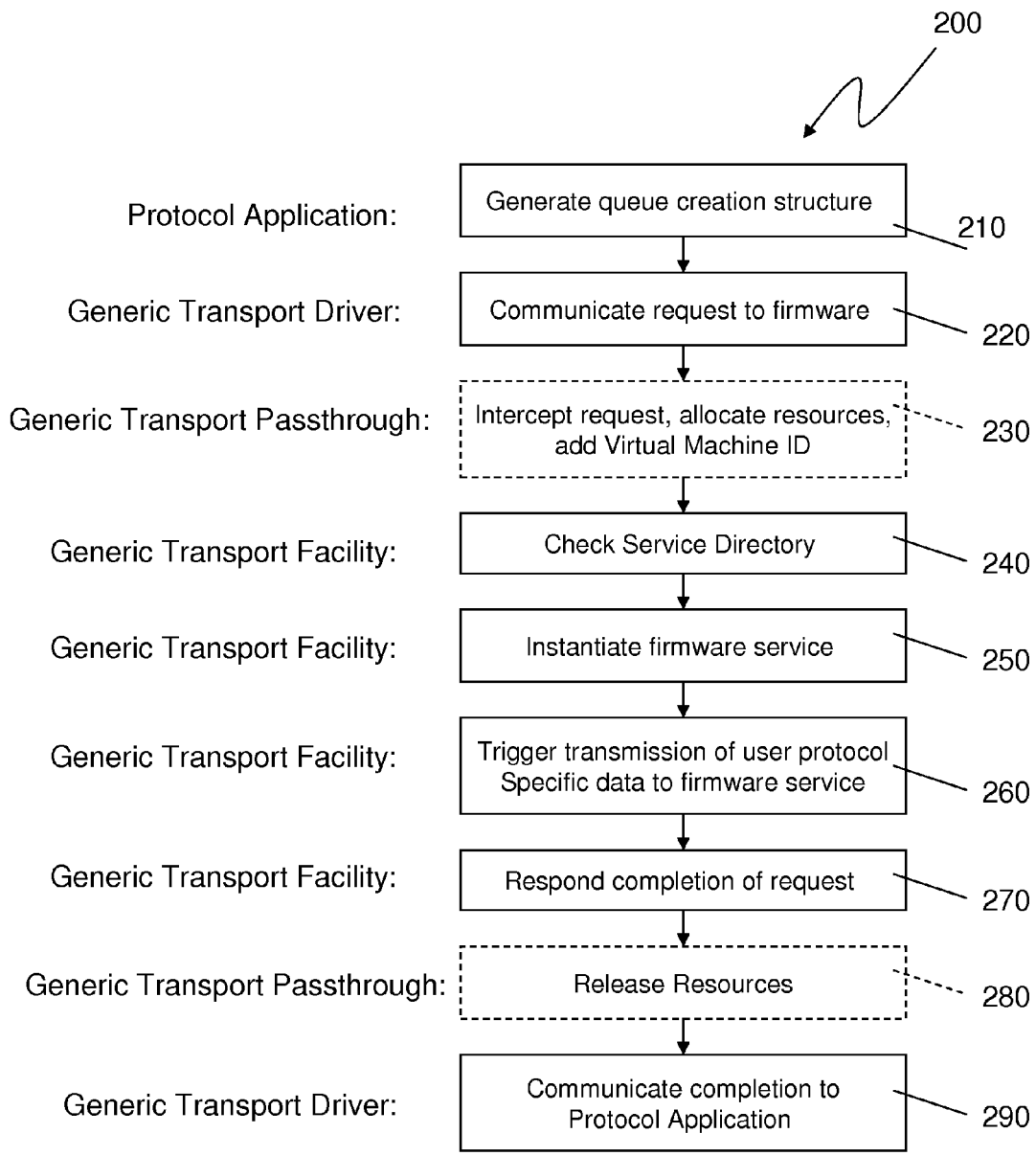
FIG. 3a a schematic diagram of a preferred embodiment of a queue creation method in the communication network of the computing system of FIG. 2.

Referring now to FIG. 3a, a flow diagram of a preferred embodiment of a queue creation method 200 for an application within computing system 1 of FIG. 2 is shown. The method uses a queuing system with a downward communication queue (command queue) for communicating commands from operating system instance 3 to firmware 4 and an upward communication queue (response queue) for communicating responses from firmware 4 to operating system 3 memory. Each queue is implemented as a ring buffer with multiple queue elements, each queue element containing a queue element ID as well as a flag (toggle bit).

Method 200 sets out with a specific Protocol Application 11 (for example, fft Protocol Application 11a), issuing a queue creation request (step 210). This request is communicated to firmware 4 by the Generic Transport Driver 8 (step 220). Virtual machine's Generic Transport Passthrough 10 intercepts the request, allocates resources (by "pinning" the corresponding address data) and adds a virtual machine ID to the request (step 230). As the Generic Transport Facility 9 of the hardware/firmware level 4 receives the request, the firmware services directory 15 is checked for a matching firmware service 12 (step 240); in the case of a request originating form the fft Protocol Application 11a, this will be fft Firmware Service 12a.

Subsequently, the respective firmware service 12 is instantiated by the Generic Transport Facility 9, and an opaque queue ID is generated which will be used to forward all requests to the respective firmware service instance (step 250). In addition, the instantiated firmware service 12a is triggered, and user protocol specific information is forwarded to this firmware service 12a (step 260). Finally, a response is issued by the Generic Transport Facility 9 to notify the Generic Transport Driver 8 about successful completion of the request and to communicate the queue ID (step 270). Finally, the Generic Transport Driver 8 communicates successful completion to the corresponding Protocol Application 11a (step 290). Note that in the case of a successful completion of the request, the resource allocation ("pinning") instantiated by Generic Transport Passthrough 10 as part of step 230 will be kept up in order to ensure data integrity of a subsequent communication between application protocol 11a and firmware service 12a. However, if the Generic Transport Facility 9 rejected the request, the pinned resources are released by the Generic Transport Passthrough 10 (step 280) so that they may be used otherwise.

Figure 3B:
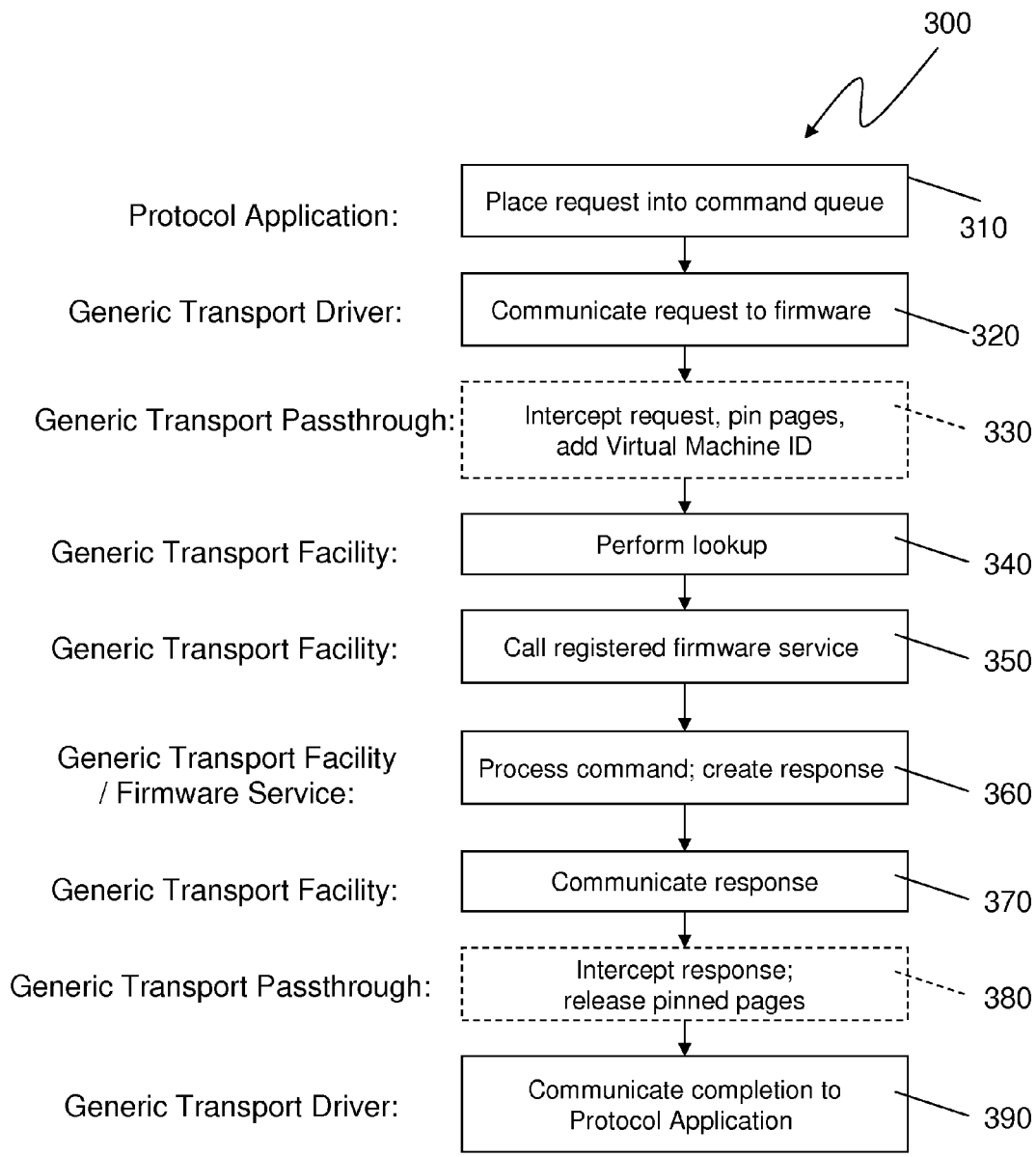
FIG. 3b a schematic diagram of a preferred embodiment of a queue placement and execution method in the communication network of the computing system of FIG. 2.
Figure 3C:
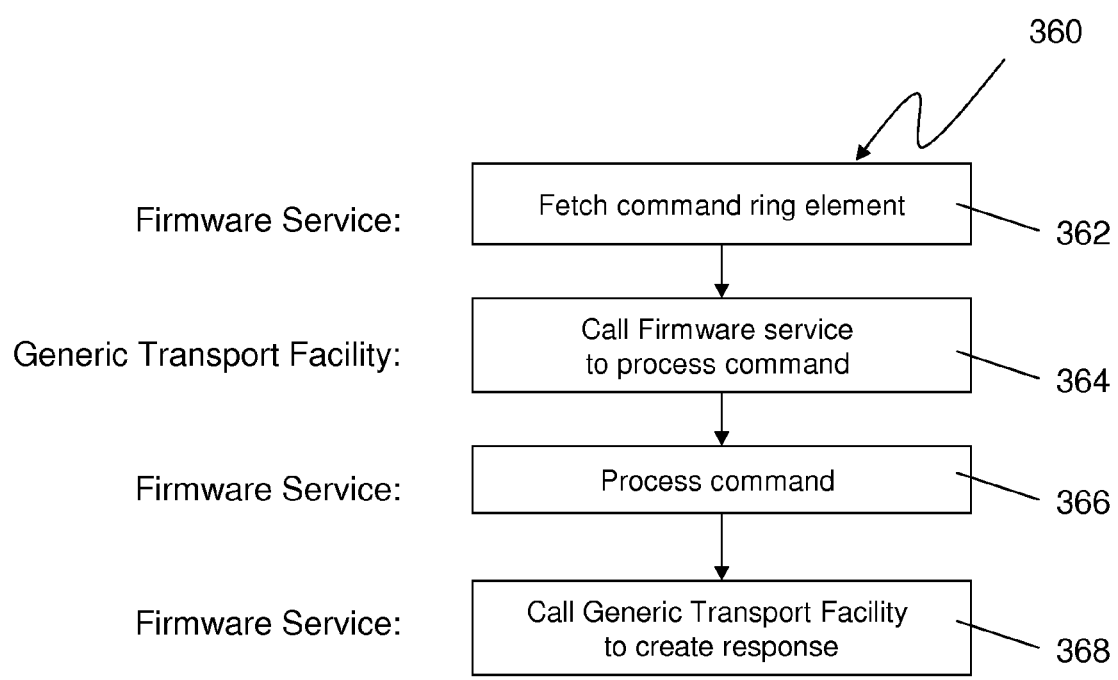
FIG. 3c a detailed schematic diagram of the command processing step of FIG. 3b.

FIG. 3b shows a preferred embodiment of a method 300 for placing and executing a command queue request. Method 300 sets out with a Protocol Application 11a placing a request into the command queue via Generic Transport Driver 8 (step 310). This request is communicated to firmware 4 by the Generic Transport Driver 8 (step 320). Virtual machine's Generic Transport Passthrough 10 intercepts the request, pins the respective memory pages, creates a shadow entry if necessary and adds a virtual machine ID to the request (step 330). As the Generic Transport Facility 9 on the hardware/firmware side 4 receives the request, a lookup of the firmware services directory 15 is carried out for identifying the requested firmware service 12a (step 340). Subsequently, the respective firmware service 12a is called (step 250), and the command is processed (step 360). The details of command processing steps 260 are depicted in FIG. 3c: As part of step 260, firmware service 12a calls Generic Transport Facility 9 to fetch the corresponding command (e.g. by accessing the respective element of a queue's ring buffer and extracting the command contained in this element) and to store the command in memory provided by the Generic Transport Facility 9 (step 362); moreover, firmware service 12a provides a callback. The Generic Transport Facility 9 calls the callback of the firmware service 12a to process the command (step 364), and the firmware service 12a proceeds to execute the command (step 366). Steps 364 and 366 are designed to keep the data contained in the corresponding ring buffer element on stack; thus, no dynamic memory allocation is necessary in firmware 4. Once the command has been processed, firmware service 12a calls Generic Transport Facility 9 to create a response (step 368). This response is communicated from Generic Transport Facility 9 to Generic Transport Driver 8 (step 370).

Generic Transport Passthrough 10 of virtual machine 5 intercepts this response (step 380) and takes appropriate steps relating to the memory pages pertaining to the specific command queue which were pinned as part of step 330. This interception is necessary since communication network 2 may process two different kinds of communication:

Some communication processes (e.g. network I/O processes such as the InfiniBand communication linking a processor to high performance I/O nodes such as storage devices) include a single action which is completed instantaneously (sending a set of data).

Other communication processes (e.g. disc I/O processes) include requests which may involve lengthy communications, e.g. the transmission of large data packages. This means that the actual data transfer may take hours but must not be leaped in order to ensure data integrity.

In order to be able to correctly process both kinds of communication, two control elements (i.e. elements signaling completion) are introduced into the response queue:

"Queue element completion" signalizes that an action was successfully started (irrespective on whether the action was terminated), and "Data completion" signalizes that the data transfer related to that action has been completed.

If, during interception step 380, a "data completion" control element is detected in the intercepted response queue, this means that memory areas allocated to this process as part of the downward communication (step 330) may be released;

accordingly, the virtual machine ID pertaining to this process is used for identifying the corresponding pinned memory addresses and shadow entries and releases them. If, however, a "Queue element completion" control element is detected, this signalizes that data transfer is still in progress, and resource allocation will be kept up to ensure integrity of the transmitted data until a "data completion" control element is issued. Note that the same Request IDs may be used for "Request Accepted" (for releasing a queue element) and for "Request Completed (for releasing data).

Irrespective of whether data transfer is terminated or still in progress (i.e. whether pinned memory regions are released or kept pinned in step 380), Generic Transport Facility 9 communicates the response to Protocol Application 11a (step 390).

Note that steps 360 and following may be asynchronous to the previous steps, depending on when the circular buffer element is processed.

Due to the Generic Transport Layer Mechanism 7, control elements originating from command queues pertaining to different application protocols 11a, 11b are identical and can thus be processed by the virtual machine in an identical way. More generally, all queue entries are optimized for virtual machine 5 parsing as a consequence of the Generic Transport Layer Mechanism 7: Since the Transport Passthrough 10 on the virtual machine 5 level is generic, only one type of queue is required for all downward queues and one type of queue is required for all upward queues. Methods 200 and 300 thus encapsulate any communication protocols in such a way that the information exchanged between Generic Transport Driver 8 and Generic Transport Facility 9 are transparent for the virtual machine 5. All queue elements use the same format and have the same size. Thus, data integrity can be ensured by appropriately pinning and releasing memory regions as part of process steps 230, 280 and 330, 380, respectively.

By making use of a Generic Transport Layer Mechanism 7 with a Generic Transport Driver/Facility/Passthrough 8,9,10 in operating system 3, firmware 4 and virtual machine 5, methods 200 and 300 provide an asynchronous communication between operating system 3 to firmware 4 as well as a simple virtualization. The corresponding queuing concept is applicable for arbitrary communication protocols.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-RAN) and DVD.

We claim:

1. A computer system comprising:
a memory having computer readable instructions and a processing device for executing the computer readable instructions, the instructions including:
a single Generic Transport Driver providing all dedicated communication protocols for all applications in an operating system instance, wherein each communication protocol among all the dedicated communication protocols being different from one another;
a virtual machine, including a Generic Transport Passthrough, for the single Generic Transport Driver of the operating system instance to exchange communication protocol data with a firmware component, wherein the Generic Transport Passthrough provides a translation layer for the applications in an operating system instance;
wherein the Generic Transport Passthrough intercepts response to the communication protocol data:
determining whether the response is a data completion, releasing all assigned resources, otherwise if the response is a queue element completion continuing data transfer; and
a Generic Transport Facility for exchanging the communication protocol data from the Generic Transport Passthrough to the firmware component of a firmware service connected to a Generic Transport Facility via a Generic Firmware Service Interface, wherein the Generic Transport Facility representing a generic transport layer endpoint for all firmware services.

2. The computer system according to claim 1, wherein the Generic Transport Facility comprises means for accessing a firmware services directory which contains information on the available firmware services.

3. The computer system according to claim 1, wherein the Generic Transport Passthrough comprises a generic shadow queue service for performing address translations between an operating system instance address space and a virtual machine address space.

4. The computer system according to claim 1, wherein the Generic Transport Passthrough comprises means for accessing a Paging Facility which enables tracking and pinning of memory addresses of data required by active application queues.

5. A computer-implemented method comprising:
issuing, by a processing device, a queue request for a communication application protocol;
communicating said queue request from a single Generic Transport Driver that supports a plurality of different communication protocols to a Generic Transport Facility via a Generic Transport Passthrough;
identifying and instantiating a matching firmware service; and
communicating completion of said queue request to the communication application protocol;
placing a command request from the communication application protocol;
communicating said command request from the single Generic Transport Driver to the Generic Transport Facility via the Generic Transport Passthrough;
identifying and instantiating a matching firmware service;
processing the command; and
communicating completion of said command to the communication application protocol;
wherein said computer system comprises:
an operating system instance with the single Generic Transport Driver supporting all dedicated communication application protocols for all applications in the operating system instance;
a firmware service connected to the Generic Transport Facility via a Generic Firmware Service Interface, the Generic Transport Facility representing a generic transport layer endpoint for all firmware services; and
a virtual machine with a Generic Transport Passthrough wherein the single Generic Transport Driver of the operating system instance exchanges communication protocol data with the Generic Transport Facility of the firmware component via the Generic Transport Passthrough Facility, the Generic Transport Passthrough providing a translation layer for all application protocols, wherein the Generic Transport Passthrough intercepts response to the communication protocol data and determines whether the response is a data completion, releasing all assigned resources, or otherwise if the response is a queue element completion continuing data transfer.

6. The method according to claim 5, further comprising the step of allocating memory resources for queue processing.

7. The method according to claim 6, wherein the memory in which resources are allocated is released if the queue request is not successfully completed.

8. A non-transitory computer readable storage medium having computer readable program code stored thereon that, when executed, performs a method, the method comprising:
issuing a queue request for a communication application protocol;
communicating said queue request from a single Generic Transport Driver that supports a plurality of different communication protocols to a Generic Transport Facility via a Generic Transport Passthrough;
identifying and instantiating a matching firmware service;
communicating completion of said queue request to the communication application protocol;
placing a command request from the communication application protocol;
communicating said command request from the single Generic Transport Driver to the Generic Transport Facility via the Generic Transport Passthrough;
identifying and instantiating a matching firmware service;
processing the command; and
communicating completion of said command to the communication application protocol;
wherein said computer system comprises:
an operating system instance with the single Generic Transport Driver supporting all dedicated communication application protocols for all applications in the operating system instance;
a firmware service connected to the Generic Transport Facility via a Generic Firmware Service Interface, the Generic Transport Facility representing a generic transport layer endpoint for all firmware services; and
a virtual machine with a Generic Transport Passthrough wherein the single Generic Transport Driver of the operating system instance exchanges communication protocol data with the Generic Transport Facility of the firmware component via the Generic Transport Passthrough Facility, the Generic Transport Passthrough providing a translation layer for all application protocols; wherein the Generic Transport Passthrough intercepts response to the communication protocol data and determines whether the response is a data completion, releasing all assigned resources, or otherwise if the response is a queue element completion continuing data transfer.

* * * * *